(12) United States Patent
Innocent et al.

(10) Patent No.: US 11,818,478 B2
(45) Date of Patent: Nov. 14, 2023

(54) IMAGE PIXELS WITH COUPLED-GATES STRUCTURES

(71) Applicant: SEMICONDUCTOR COMPONENTS INDUSTRIES, LLC, Phoenix, AZ (US)

(72) Inventors: Manuel H. Innocent, Wezemaal (BE); Robert Michael Guidash, Fairport, NY (US); Tomas Geurts, Haasrode (BE)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 0 days.

(21) Appl. No.: 17/657,489

(22) Filed: Mar. 31, 2022

(65) Prior Publication Data
US 2022/0264038 A1   Aug. 18, 2022

Related U.S. Application Data

(63) Continuation of application No. 17/178,416, filed on Feb. 18, 2021, now Pat. No. 11,323,644.

(51) Int. Cl.
*H04N 25/621* (2023.01)
*H04N 25/75* (2023.01)

(52) U.S. Cl.
CPC .......... *H04N 25/623* (2023.01); *H04N 25/75* (2023.01)

(58) Field of Classification Search
CPC .................................................. H04N 5/3594
(Continued)

(56) References Cited

U.S. PATENT DOCUMENTS 9,900,481 B2   2/2018 Geurts et al.
10,791,292 B1  9/2020 Geurts
(Continued)

FOREIGN PATENT DOCUMENTS

DE   202017102626 U1   7/2017
DE   202017100976 U1   9/2017
(Continued)

OTHER PUBLICATIONS

Sakai et al. "A 2.8 μm Pixel-Pitch 55 ke- Full-Well Capacity Global-Shutter Complementary Metal Oxide Semiconductor Image Sensor Using Lateral Overflow Integration Capacitor," Japanese Journal of Applied Physics 52 (2013) 04CE01, Feb. 20, 2013.
(Continued)

*Primary Examiner* — Joel W Fosselman
(74) *Attorney, Agent, or Firm* — Treyz Law Group, P.C.; Tianyi He

(57) ABSTRACT

An image sensor may include an array of image pixels. The array of image pixel may be coupled to control circuitry and readout circuitry. One or more image pixels in the array may each include a coupled-gates structure coupling a photodiode at one input terminal to a capacitor at a first output terminal and to a floating diffusion region at a second output terminal. The coupled-gates structure may include a first transistor that sets a potential barrier defining overflow portions of the photodiode-generated charge. Second and third transistors in the coupled-gates structure may be modulated to transfer the overflow charge to the capacitor and to the floating diffusion region at suitable times. The second and third transistors may form a conductive path between the capacitor and the floating diffusion region for a low conversion gain mode of operation.

20 Claims, 9 Drawing Sheets

(58) Field of Classification Search
USPC .......................................................... 348/241
See application file for complete search history.

(56) References Cited

U.S. PATENT DOCUMENTS

2017/0150017 A1* 5/2017 Geurts ................. H04N 5/3559
2018/0191969 A1 7/2018 Innocent et al.

FOREIGN PATENT DOCUMENTS

DE 102017209407 A1 12/2017
DE 102020004050 A1 1/2021

OTHER PUBLICATIONS

Search Report for counterpart DE Application No. 102022102417.
2, dated Aug. 19, 2023, 8 pages.

* cited by examiner

IMAGE PIXELS WITH COUPLED-GATES STRUCTURES

This application is a continuation of U.S. patent application Ser. No. 17/178,416, filed on Feb. 18, 2021, which is hereby incorporated by reference herein in its entirety.

BACKGROUND

This relates generally to imaging systems, and more particularly, to pixel circuitry in image sensors.

Image sensors are commonly used in electronic devices to capture images.

In a typical arrangement, an image sensor includes an array of image pixels arranged in pixel rows and pixel columns.

Typically, each image pixel contains a photosensitive element for generating charge in response to incident light, charge storage structures that store the generated charge, and transistors that couple one or more pixel elements to each other. In some applications, it may be desirable to provide image pixels with one or more low gain capacitors (e.g., for a low gain mode of operation in which low gain signals are generated). However, the inclusion of such capacitors or other charge storage structures can lead to the inclusion of additional transistors or other elements (for connectivity within the image pixel) that require additional pixel area. This becomes especially problematic as the sizes of image pixels are scaled down.

It would therefore be desirable to provide pixel circuitry and a pixel configuration having a small number of transistors or other elements, while still providing satisfactory pixel operation (e.g., in a low gain mode of operation).

DETAILED DESCRIPTION

Electronic devices such as digital cameras, computers, cellular telephones, and other electronic devices may include image sensors that gather incident light to capture an image. The image sensors may include arrays of image pixels. The pixels in the image sensors may include photosensitive elements such as photodiodes that convert the incident light into image charge (e.g., image signals). Image sensors may have any number of pixels (e.g., hundreds or thousands or more). A typical image sensor may, for example, have hundreds of thousands or millions of pixels (e.g., megapixels). Image sensors may include control circuitry such as circuitry for operating the image pixels and readout circuitry for reading out image signals corresponding to the electric charge generated by the photosensitive elements.

Figure 1:
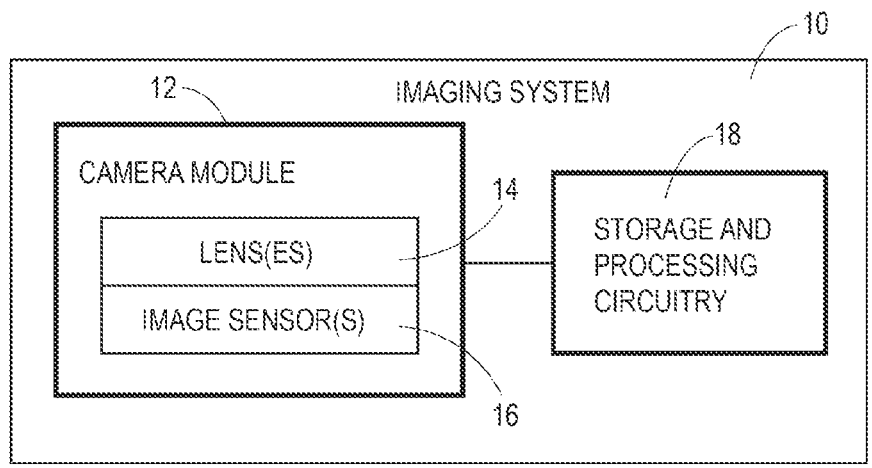
FIG. 1 is a diagram of an illustrative imaging system having one or more image sensors and processing circuitry for capturing images in accordance with some embodiments.

FIG. 1 is a diagram of an illustrative imaging system such as an electronic device that uses an image sensor to capture images. Imaging system 10 of FIG. 1 may be a portable electronic device such as a camera, a cellular telephone, a tablet computer, a laptop computer, a webcam, or a video camera, may be other types of imaging systems such as a video surveillance system, an automotive imaging system, a video gaming system with imaging capabilities, an augmented reality and/or virtual reality system, an unmanned aerial vehicle system (e.g., a drone), or an industrial system, or may be any other suitable imaging systems or devices that capture image data. Camera module 12 (sometimes referred to as an imaging module) may be used to convert incoming light into digital image data. Camera module 12 may include one or more lenses 14 and one or more corresponding image sensors 16. Lenses 14 may include fixed and/or adjustable lenses and may include microlenses formed on an imaging surface of image sensor 16 and other macro lenses. During image capture operations, light from a scene may be focused onto image sensor 16 by lenses 14. Image sensor 16 may include circuitry for converting analog pixel image signals into corresponding digital image data that is provided to storage and processing circuitry 18. If desired, camera module 12 may be provided with an array of lenses 14 and an array of corresponding image sensors 16.

Storage and processing circuitry 18 may include one or more integrated circuits (e.g., image processing circuits, microprocessors, storage devices such as random-access memory and non-volatile memory, etc.) and may be implemented using components that are separate from the camera module and/or that form part of the camera module (e.g., circuits that form part of an integrated circuit that includes image sensors 16 or an integrated circuit within the module that is associated with image sensors 16). When storage and processing circuitry 18 is included on different integrated circuits (e.g., chips) than those of image sensors 16, the integrated circuits with processing circuitry 18 may be stacked or packaged with respect to the integrated circuits with image sensors 16. Image data that has been captured by camera module 12 may be processed and stored using processing circuitry 18 (e.g., using an image processing engine on processing circuitry 18, using an imaging mode selection engine on processing circuitry 18, etc.). Processed image data may, if desired, be provided to external equipment (e.g., a computer, an external display, or other devices) using wired and/or wireless communications paths coupled to processing circuitry 18.

Figure 2:
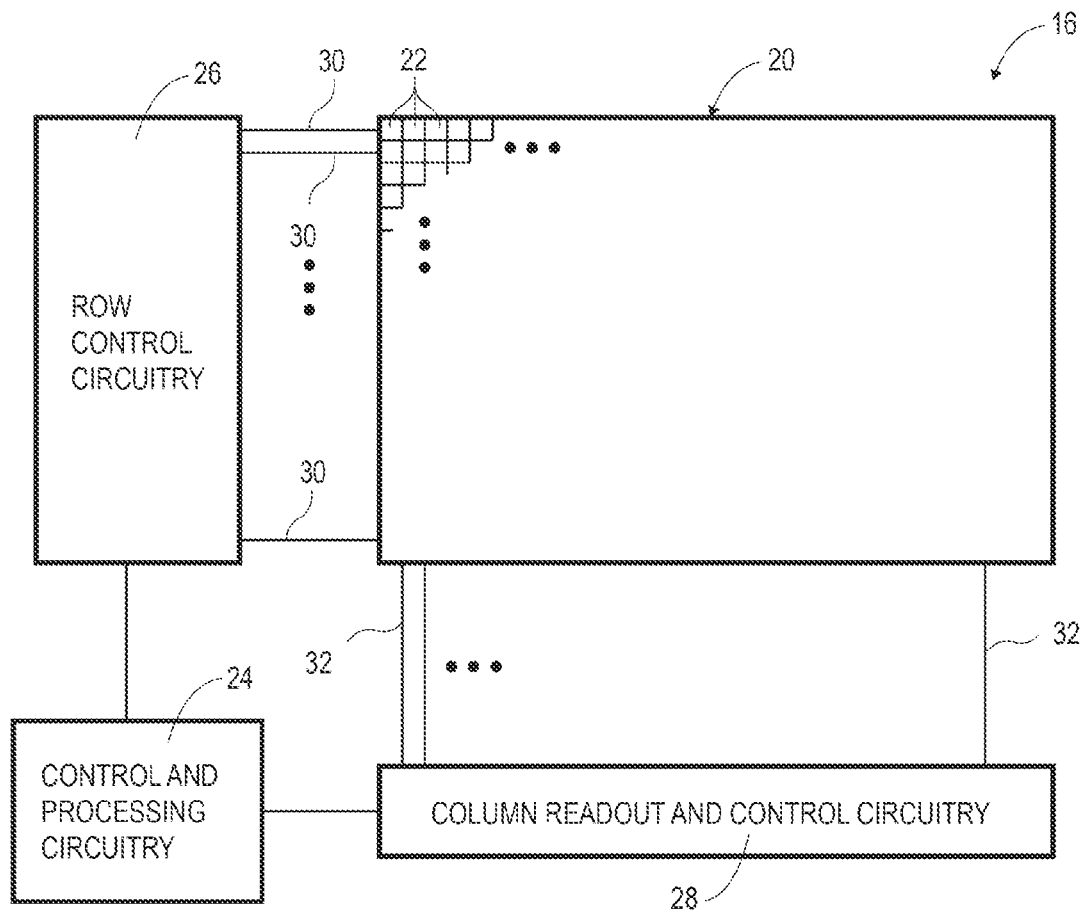
FIG. 2 is a diagram of illustrative image sensor circuitry having a pixel array and control and readout circuitry for the pixel array in accordance with some embodiments.

As shown in FIG. 2, image sensor 16 may include a pixel array 20 containing image sensor pixels 22 (sometimes referred to herein as image pixels or simply pixels) and control and processing circuitry 24. In some configurations described herein as illustrative examples, image pixels 22 may be arranged in rows and columns. Array 20 may contain, for example, hundreds or thousands of rows and columns of image pixels 22. Control circuitry 24 may be coupled to row control circuitry 26 (sometimes referred to as row driver circuitry) and column readout and control circuitry 28 (sometimes referred to as column control circuitry, column readout circuitry, or simply readout circuitry). Row control circuitry 26 may receive row addresses from control circuitry 24 and supply corresponding row control signals such as reset, anti-blooming, row select, charge transfer, dual conversion gain (e.g., low conversion gain), and readout control signals to each row of pixels 22 over one or more control paths such as row control paths 30. One or more conductive paths such as column lines 32 may be coupled to each column of pixels 22 in array 20. Column lines 32 may be used for reading out image signals from pixels 22 and for supplying bias signals (e.g., bias currents or bias voltages) to pixels 22. If desired, during pixel readout operations, a pixel row in array 20 may be selected using row control circuitry 26 and image signals generated by image pixels 22 in that pixel row can be read out along column lines 32.

Column readout circuitry 28 may receive image signals (e.g., analog pixel values generated by pixels 22) over column lines 32. Column readout circuitry 28 may include memory circuitry for temporarily storing calibration signals (e.g., reset level signals, reference level signals) and/or image signals (e.g., image level signals) read out from array 20, amplifier circuitry, analog to digital conversion (ADC) circuitry, bias circuitry, latch circuitry for selectively enabling or disabling the column circuitry, or other circuitry that is coupled to one or more columns of pixels in array 20 for operating pixels 22 and for reading out image signals from pixels 22. ADC circuitry in readout circuitry 28 may convert analog pixel values received from array 20 into corresponding digital pixel values (sometimes referred to as digital image data or digital pixel data). Column readout circuitry 28 may supply the digital pixel data associated with pixels in one or more pixel columns to control and processing circuitry 24 and/or processor 18 (FIG. 1).

Pixel array 20 may also be provided with a filter array having multiple (color) filter elements (each corresponding to one or more respective pixels) which allows a single image sensor to sample light of different colors or sets of wavelengths. As an example, image sensor pixels such as the image pixels in array 20 may be provided with a color filter array having red, green, and blue filter elements, which allows a single image sensor to sample red, green, and blue (RGB) light using corresponding red, green, and blue image sensor pixels arranged in a Bayer mosaic pattern. As another example, the green pixels in a Bayer pattern may be replaced by broadband image pixels having broadband color filter elements (e.g., clear color filter elements, yellow color filter elements, etc.). In yet another example, one of the green pixels in a Bayer pattern may be replaced by infrared (IR) image pixels formed under IR color filter elements and/or the remaining red, green, and blue image pixels may also be sensitive to IR light (e.g., may be formed under filter elements that pass IR light in addition to light of their respective colors). These examples are merely illustrative and, in general, filter elements of any desired color and/or wavelength and in any desired pattern may be formed over any desired number of image pixels 22.

Figure 3:
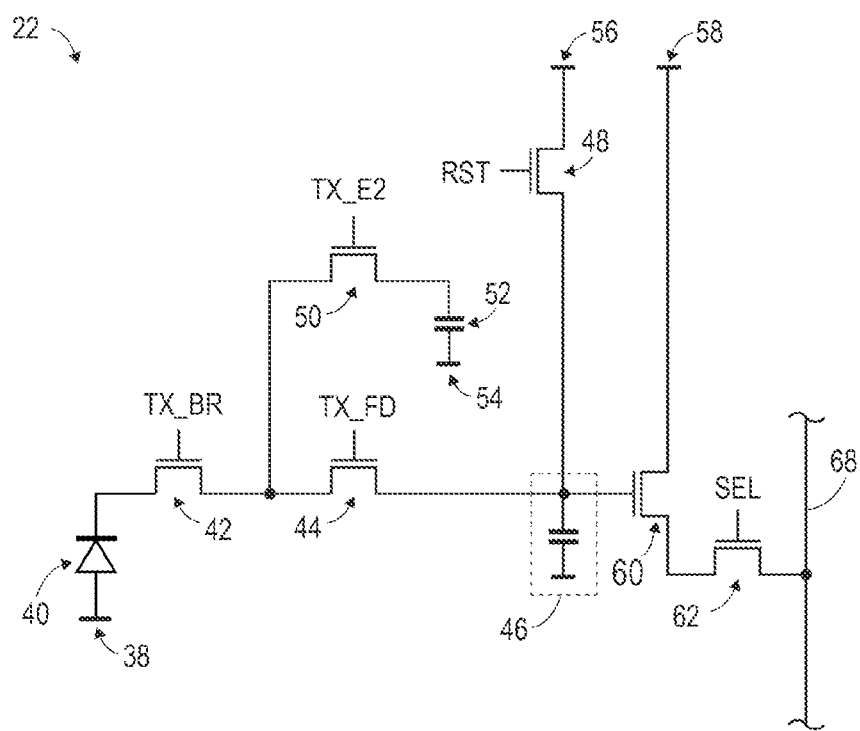
FIG. 3 is a circuit diagram of an illustrative image pixel having a coupled-gates structure in accordance with some embodiments.

FIG. 3 is a circuit diagram of an illustrative image pixel 22. As shown in FIG. 3, pixel 22 includes a photosensitive element such as photodiode 40. Photodiode 40 has a first terminal coupled to a voltage terminal 38 that receives a reference voltage (e.g., a ground voltage). Charge from incident light may be collected by photodiode 40. Photodiode 40 may generate charge (e.g., electrons) in response to receiving the incident light (e.g., impinging photons). The amount of charge that is collected by photodiode 40 may depend on the intensity of the impinging light and the exposure duration (or integration time).

Pixel 22 in FIG. 3 also includes a floating diffusion region such as floating diffusion region 46. Floating diffusion region 46 may be a doped semiconductor region (e.g., a region in a silicon substrate that is doped by ion implantation, impurity diffusion, or other doping process). Accordingly, floating diffusion region 46 may have an associated charge storage capacity (e.g., schematically shown as a capacitor in FIG. 3). Photodiode charge or other charge (e.g., reset voltage level charge, dark current charge, etc.) may be transferred and stored at floating diffusion region 46 for a pixel readout operation.

In some applications, it may be desirable to extend the storage capacity of floating diffusion region 46 and operate pixel 22 in a low (conversion) gain mode of operation by including a low (conversion) gain capacitor. As shown in FIG. 3, pixel 22 includes a charge storage structure such as capacitor 52 (e.g., a low gain capacitor). In order to more efficiently couple floating diffusion region 46 to capacitor 52, pixel 22 in FIG. 3 may include a coupled-gates structure (e.g., a structure including multiple transistors or gates coupled to one another) between capacitor 52 and floating diffusion region 46.

In particular, pixel 22 may include transistors 42, 44, and 50 (e.g., as part of the coupled-gates structure in pixel 22). As shown in FIG. 3, transistors 42 and 44 couple (e.g., selectively connect) photodiode 40 to floating diffusion region 46, thereby allowing photodiode-generated charge to be transferred using transistors 42 and 44 from photodiode 40 to floating diffusion region 46. Transistors 42 and 50 couple photodiode 40 to capacitor 52, thereby allowing photodiode-generated charge to be transferred using transistors 42 and 50 from photodiode 40 to capacitor 52. Capacitor 52 may be configured to integrate multiple instances of received charge and store the integrated charge. Transistors 44 and 50 couple floating diffusion region 46 to capacitor 52, thereby allowing capacitor 52 to be connected by a conductive path between floating diffusion region 46 and capacitor 52 using transistors 44 and 50 (e.g., for a charge sharing operation, for a charge transfer operation, etc.).

Transistor 50 may be coupled to a first terminal of charge storage structure 52 (e.g., a first terminal of capacitor 52). A second terminal of charge storage structure 52 (e.g., a second terminal of capacitor 52) may be coupled to a voltage terminal 54 that receives a reference voltage (signal). As examples, voltage terminal 54 may provide a fixed refence voltage to the second terminal of capacitor 52 or may provide a variable reference voltage signal (e.g., exhibiting a first voltage value during a first time period, a second voltage value during a second time period, etc.) to the second terminal of capacitor 52.

Because photodiode 40 provides generated charge into the coupled-gates structure, the terminal of transistor 42 coupled to photodiode 40 may be referred to as an input terminal of the coupled-gates structure. Analogously, because the coupled-gates structure outputs the photodiode-generated charge to floating diffusion region 46 and capacitor 52, the terminal of transistor 44 coupled to floating diffusion region 46 and the terminal of transistor 50 coupled to capacitor 52 may be referred to as first and second output terminals of the coupled-gates structure, respectively.

If desired, the middle node or region in the coupled-gates structure between (shared by) transistors 42, 44, and 50 may be a depleted node. More generally, the coupled-gate structure may be configured (e.g., by having the depleted node) such that each transfer of photodiode-generated overflow charge into the corresponding region (e.g., overflow charge from photodiode 40 to floating diffusion region 46 or to capacitor 52) may completely transfer all of the corresponding overflow charge to the corresponding region. If desired, the coupled-gates structure may include any other suitable structures to facilitate this complete transfer of all overflow charge as well as the transfer of other (remaining) photodiode-generated charge when desired.

To reset one or more pixel elements (e.g., to a reset voltage level), pixel 22 may include a reset transistor such as reset transistor 48. As shown in FIG. 3, transistor 48 couples a voltage terminal 56 that receives a reference voltage (e.g., a power supply voltage associated with a reset voltage level) to floating diffusion region 46. In particular, when transistor 48 is activated (e.g., by asserting control signal RST), floating diffusion region 46 may be reset to a reset voltage level (e.g., a power supply voltage). Additionally, transistor 48, when activated along with other transistors (e.g., along with transistors 42, 44, and 50 by asserting corresponding control signals TX_BR, TX_FD, and TX_E2), may also reset photodiode 40 and capacitor 52 to the reset voltage level. Transistors 42, 44, and 48 may also provide an anti-blooming path for photodiode 40 (e.g., to voltage terminal 56), as an example.

As shown in FIG. 3, pixel 22 includes source follower transistor 60 and pixel select (or row select) transistor 62 that form the readout portion of pixel 22. In particular, select transistor 62 has a gate terminal that is controlled by select signal SEL. When select signal SEL is asserted, transistor 62 is activated and a corresponding pixel output signal having a magnitude that is proportional to the amount of charge at floating diffusion region 46, is passed onto a pixel output path such as column line 68 (e.g., line 32 in FIG. 2) via source follower transistor 60. When floating diffusion region 46 stores photodiode-generated charge that is being read out, the corresponding pixel output signal may be referred to as an image (level) signal. When floating diffusion region 46 stores reset voltage level charge that is being read out, the corresponding pixel output signal may be referred to as a reset level signal.

In an illustrative image pixel array configuration, there are numerous rows and columns of pixels 22. A column line 68 may be associated with each column of pixels 22 (e.g., each image pixel 22 in a column may be coupled to the same column line 68 through a corresponding row select transistor 62). Control signal SEL may be asserted to read out a pixel output signal from a selected image pixel 22 onto column line 68. The pixel output signal may be provided to readout circuitry 28 (FIG. 2), and thereafter, to processing circuitry 18 (FIG. 1) for further processing.

An image sensor having an array of image pixels such as pixel 22 in FIG. 3 may operate in varying light conditions (e.g., in a relatively low light environment, in a relatively high light environment, in an intermediate light environment between the low and high light environment, etc.). In some applications (e.g., in order to provide high dynamic range images), it may be desirable for pixel 22 in FIG. 3 to generate more than one image signal (e.g., two image signals) for each integration cycle (e.g., for each integration time period).

Configurations in which pixel 22 in FIG. 3 generates a low conversion gain image signal based on overflow charge (e.g., one or more overflow portions of photodiode-generated charge) and a high conversion gain image signal based on remaining charge (e.g., a portion of photodiode-generated charge that remain stored at the photodiode after removing the one or more overflow portions of photodiode-generated charge) are described herein as illustrative examples. Accordingly, FIG. 4 is an illustrative timing diagram showing how a pixel such as pixel 22 in FIG. 3 may be operable to generate these low and high conversion gain signals.

Figure 4:
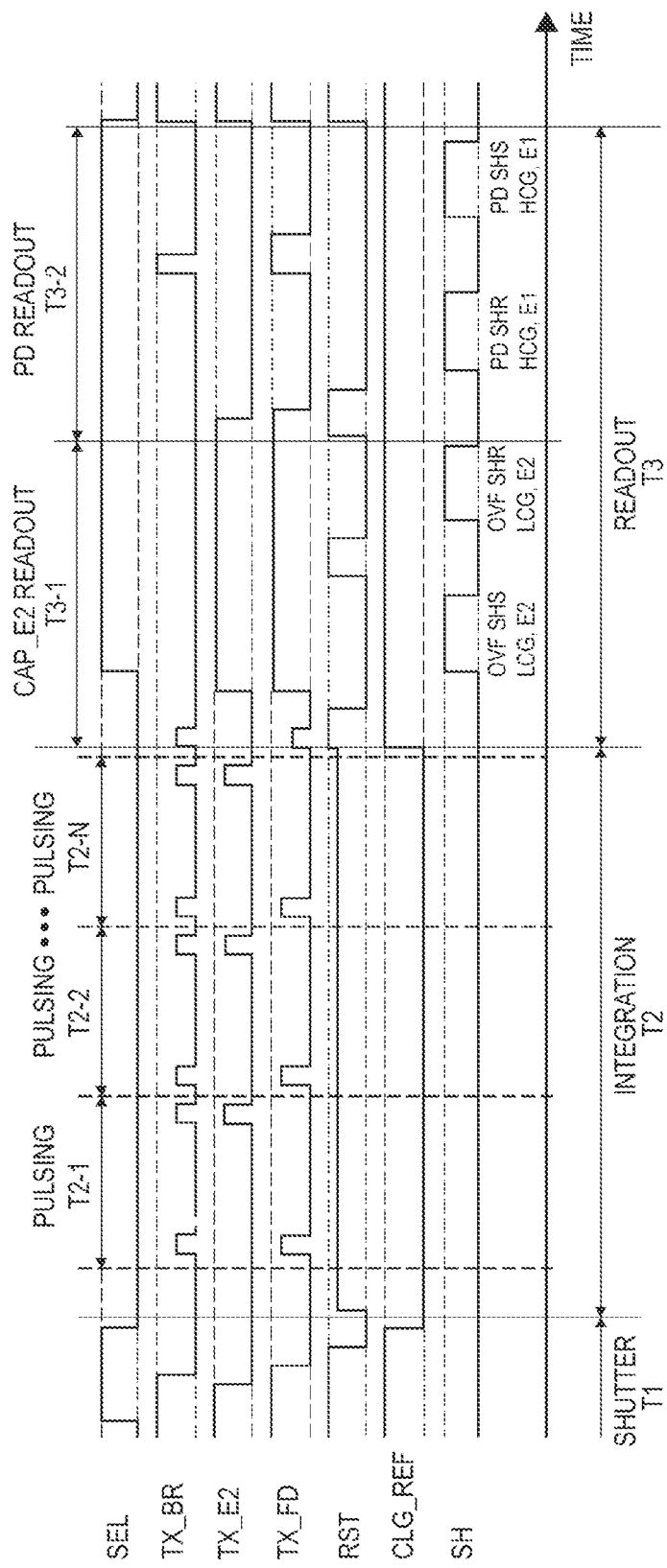
FIGS. 4, 5A, and 5B are illustrative timing diagrams for operating an image pixel such as the image pixel in FIG. 3 in accordance with some embodiments.

In the example of FIG. 4, control signals SEL, TX_BR, TX_E2, TX_FD, RST, CLG_REF, and SH may be used to control the operation of pixel 22. In particular, control circuitry such as row control circuitry 26 and/or control circuitry 24 (FIG. 2) may be configured to provide one or more (e.g., all) of these controls signal to corresponding elements in pixel 22 (and to other circuitry such as readout circuitry 28) via respective control lines 30 (FIG. 2). With reference to pixel 22 in FIG. 3, the control circuitry may provide control signal SEL to transistor 62, provide control signal TX_BR to transistor 42, provide control signal TX_E2 to transistor 50, provide control signal TX_FD to transistor 44, provide control signal RST to transistor 48, provide control signal (or reference voltage signal) CLG_REF to voltage terminal 54, and provide control signal SH to corresponding readout circuitry components such as sampling-and-hold circuits and sampling switches or circuits in readout circuitry 28 (FIG. 2).

As shown in FIG. 4, the control circuitry may operate pixel 22 during a shutter time period T1, an integration time period T2, and a readout time period T3. During shutter time period T1, the control circuitry may fully assert control signals SEL, TX_BR, TX_E2, TX_FD, and RST to reset pixel elements in pixel 22 (e.g., floating diffusion region 46, photodiode 40, capacitor 52, etc.) to a reset voltage level (e.g., a pixel power supply voltage supplied at voltage terminal 56). After photodiode 40 has been reset to a reset voltage level (e.g., after the deassertion of control signal TX_BR during shutter time period T1), an integration time period for photodiode 40 may begin (e.g., photodiode 40 may begin accumulating charge in response to incident light).

During integration time period T2, the transfer of overflow portions of photodiode-generated charge may be modulated between (e.g., selectively transferred to) floating diffusion region 46 and capacitor 52 using control signals TX_BR, TX_E2, and TX_FD. This selective transfer of photodiode overflow charge may be performed repeatedly across a number of pulsing time periods. Transistor 42 may be configured to serve as (e.g., form, define, etc.) a potential barrier that separates photodiode-generated charge at photodiode 40 into first and second portions (e.g., a first overflow portion that is above the potential barrier, and a second remaining portion that is below the potential barrier). In particular, the control circuitry may (partially) assert control signal TX_BR to a suitable voltage level to control transistor 42 and form the potential barrier. Along with this partial assertion of TX_BR, the control circuitry may also (partially) assert one of control signals TX_FD or TX_E2 to transfer the overflow portion of photodiode-generated charge to floating diffusion region 46 or capacitor 52, respectively.

As an illustrative example, the control circuitry may provide a control signal at a first voltage level to fully assert the control signal, may provide the control signal at a second voltage level to deassert the control signal, and may provide the control signal at a third suitable voltage level between the first and second voltage levels to partially assert the control signal. The third voltage level for each control signal may vary and may be adjusted as desired depending on the type and function of the control signals (e.g., to provide a desired potential barrier level, to ensure sufficient charge transfer, etc.).

In the example of FIG. 4, integration time period T2 may include a number of pulsing time periods T2-1, T2-2, . . . , T2-N, during which the transfer of overflow charge to floating diffusion region 46 and to capacitor 52 occurs. While in the example of FIG. 4, three such pulse time periods are shown, this is merely illustrative. If desired, integration time period T2 may include any suitable number of pulsing time periods. During each time period, respective overflow charge portions of photodiode-generated charge may be transferred first to floating diffusion region 46 and then to capacitor 52.

As shown in FIG. 4, each pulsing period may include a partial assertion of control signal TX_BR simultaneously with a (partial) assertion of TX_FD (e.g., assertions pulses of control signals TX_BR and TX_FD) to set a suitable potential barrier to define the overflow portion of photodiode-generated charge and transfer the defined overflow portion of photodiode-generated charge to floating diffusion region 46 (e.g., through transistors 42 and 44). After a suitable amount of time following the pulsing of control signals TX_BR and TX_FD, control signals TX_BR and TX_E2 may also be pulsed within the pulsing period. In particular, control signals TX_BR may be partially asserted simultaneously with the (partial) assertion of control signal TX_E2 to set a suitable potential barrier to define an overflow portion of photodiode-generated charge and transfer the defined overflow portion of photodiode-generated charge to capacitor 52 (e.g., through transistors 42 and 50). The overflow portions of photodiode-generated charge transferred to capacitor 52 across the multiple pulsing time periods may be integrated or combined with each other.

During the integration time period, the control circuitry may partially assert control signal RST (periodically or continuously) to provide an anti-blooming path for photodiode-generated charge (e.g., for the overflow portions of charge transferred to floating diffusion region 46 and not used to generate any image signals).

Figure 5A:
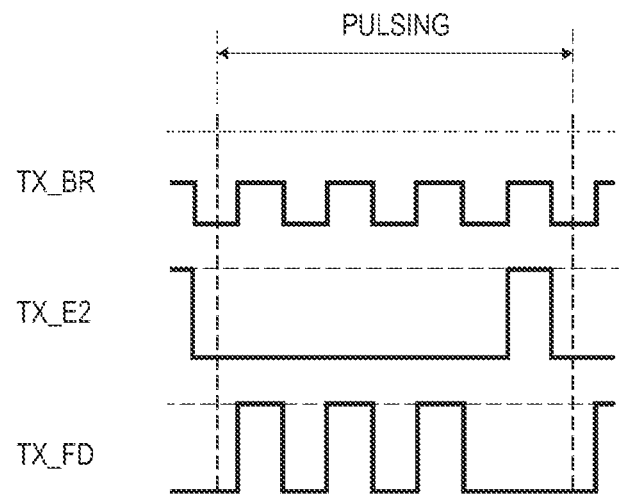
Figure 5B:
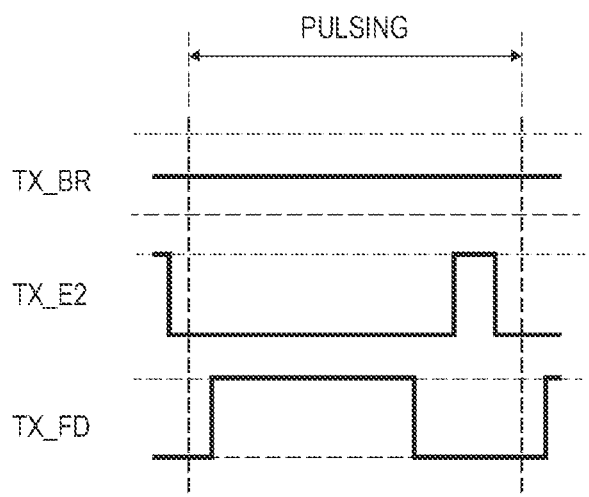

The operation of pixel 22 during each pulsing period as shown in FIG. 4 is merely illustrative. If desired, the control circuitry may assert control signals TX_BR, TX_E2, and TX_FD in any other suitable manner. As a first illustrative example shown in FIG. 5A, during each pulsing time period, the control circuitry may simultaneously assert control signals TX_BR and TX_FD multiple times (e.g., in multiple pulses) before simultaneously asserting control signals TX_BR and TX_E2. As a second illustrative example shown in FIG. 5B, during each pulsing time period, the control circuitry may continuously (and partially) assert control signal TX_BR instead of pulsing control signal TX_BR (as shown in FIGS. 4 and 5A), and may assert control signal TX_FD for a longer time period (e.g., for a substantial amount of time during which control signal TX_E2 is not asserted) before pulsing control signal TX_E2. If desired, the control circuitry may operate pixel 22 at one or more pulsing time period in the integration time period using the scheme shown in FIG. 5A or 5B (e.g., instead of the scheme in FIG. 4).

Referring back to FIG. 4, the control circuitry may operate pixel 22 to perform a pixel readout operation during readout time period T3 following the final pulsing time period T2_N. The control circuitry may assert control signal SEL throughout the pixel readout operation during readout time period T3 (or at least when pixel output signals are being passed to a pixel output or column line). Readout time period T3 may include a first readout time period T3-1 for overflow charge stored at capacitor 52 and a second readout time period T3-2 for remaining charge stored at photodiode 40.

During readout time period T3-1, the control circuitry may (partially) assert control signals TX_BR and TX_FD and assert control signal RST to transfer and remove an overflow charge portion from photodiode 40 and to reset floating diffusion region 46 to a reset voltage level (e.g., a pixel power supply voltage). Thereafter, the control circuitry may (fully) assert control signals TX_E2 and TX_FD simultaneously to conductively connect capacitor 52 to floating diffusion region 46 through transistors 44 and 50. This can allow a low conversion gain readout of overflow charge at capacitor 52 (e.g., overflow charge that combines or integrates overflow charge from each of the pulsing periods) by extending the storage capacity of floating diffusion region 46 using capacitor 52. In particular, the control circuitry may assert control signal SH to activate sampling circuitry in readout circuitry to sample and store (e.g., at the sampling circuitry) a low conversion gain image signal associated with the overflow charge shared between capacitor 52 and floating diffusion region 46.

Thereafter, the control circuitry may assert control signal RST (while control signals TX_E2 and TX_FD remain asserted) to reset floating diffusion region 46 and capacitor 52 to a reset voltage level (e.g., a pixel power supply voltage supplied at voltage terminal 56). After control signal RST is deasserted, the control circuitry may assert control signal SH (while control signals TX_E2 and TX_FD remain asserted) to sample and store a reset level signal generated based on the reset level voltage at floating diffusion region 46 (having its storage capacity extend by capacitor 52 in a low conversion gain mode of operation). This reset level signal may be associated with the overflow charge low conversion gain image signal and may be used to compensate for noise in the overflow charge low conversion gain image signal.

After readout time period T3-1 and during readout time period T3-2, the control circuitry may again assert control signal RST to reset floating diffusion region to a reset voltage. After control signal RST is deasserted, the control circuitry may assert control signal SH (while control signals TX_E2 and TX_FD are deasserted) to sample and store another reset level signal generated based on the reset level voltage at floating diffusion region 46 (in a high conversion gain mode of operation, in which capacitor 52 disconnected from floating diffusion region 46). This reset level signal may be associated with a photodiode-stored charge high conversion gain image signal and may form a correlated double sampling readout with the subsequently read out and sampled photodiode-stored charge high conversion gain image signal.

In particular, after sampling of this reset level signal, the control circuitry may (fully) assert control signals TX_BR and TX_FD simultaneously to transfer photodiode-stored charge from photodiode 40 to floating diffusion region 46 through transistors 42 and 44. Subsequently, the control circuitry may assert control signal SH to activate sampling circuitry in readout circuitry to sample and store a high conversion gain image signal associated with the photodiode-stored charge transferred from photodiode 40 to floating diffusion region 46 (in a high conversion gain mode of operation, in which capacitor 52 disconnected from floating diffusion region 46).

If desired, the reference voltage signal provided at voltage terminal 54 (FIG. 3) may be at different voltages during different time periods of pixel operation to supply different reference voltages to the second terminal of capacitor 52. As an illustrative example shown in FIG. 4, the control circuitry may provide a first reference voltage level during shutter and readout time periods T1 and T3 and may provide a second reference voltage level during integration time period T2. This is merely illustrative.

In the manner described above in connection with FIGS. 4, 5A, and 5B, the control circuitry may operate pixel 22 to generate and read out an overflow charge image signal and a corresponding reset level signal in a low conversion gain mode of operation, and to generate and read out a photodiode-stored charge image signal and a corresponding reset level signal in a high conversion gain mode of operation (and in a correlated double sampling readout). Advantageously, with the use of a coupled-gates structure, pixel 22 is configured to generate these pixel signals while omitting a number of elements (e.g., a transistor directly connecting capacitor 52 to floating diffusion region 46). In other words, capacitor 52 is connected to floating diffusion region 46 only through at least two transistors (both of which also serve overflow charge modulation purposes), and a separate transistor directly connecting capacitor 52 to floating diffusion region 46 is not required. This desirably reduces area requirements when implementing the pixel and provides an improved pixel configuration especially in applications utilizing pixels having small pixel sizes.

Figure 6:
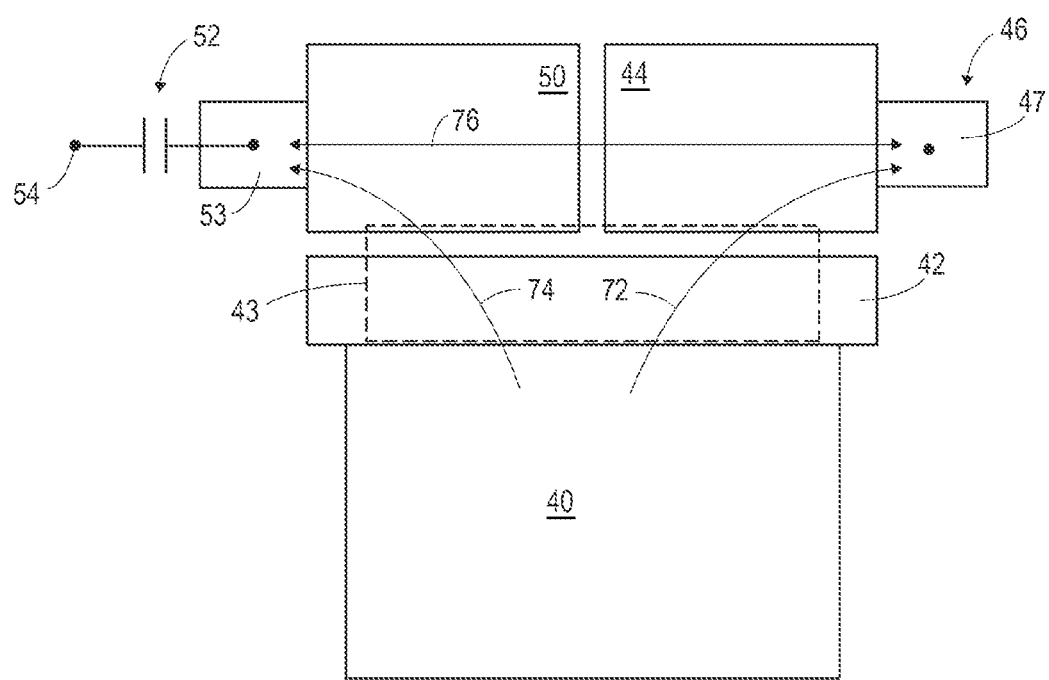
FIG. 6 is an illustrative pixel layout for implementing a coupled-gates structure such as the coupled-gates structure in FIG. 3 in accordance with some embodiments.

FIG. 6 is a schematic plan view of an illustrative pixel layout for implementing a coupled-gates structure such as the coupled-gates structure in pixel 22 in FIG. 3 (e.g., transistors 42, 44, and 50 in FIG. 3). As shown in FIG. 6, transistor (or gate) 42 may be interposed between photodiode 40 and transistors (or gates) 44 and 50 along a first direction. Transistors 50 and 44 may be interposed between terminal 53 (e.g., connected to the second terminal of capacitor 52 opposing the terminal connected to voltage terminal 54) and terminal 47 (e.g., connected to or forming a portion of floating diffusion region 46) along a second direction perpendicular to the first direction. Configured in such a manner, transistor 42 (by receiving a partially asserted control signal) may form a potential barrier in region 43 (sometimes referred to as an overflow barrier that defines an overflow charge from photodiode 40).

During the integration time period (e.g., during each pulsing period in one of FIG. 4, 5A, or 5B), control signals TX_FD (for transistor 44) and TX_E2 (for transistor 50) may be asserted one at a time with suitable frequencies and durations to modulate the flow of the overflow charge defined by potential barrier region 43 to one of terminal 47 (e.g., to floating diffusion region 46) or terminal 53 (e.g., to capacitor 52), as indicated by arrows 72 and 74, respectively. During the readout time period (e.g., readout time period T3-1 in FIG. 4), control signals TX_FD and TX_E2 may be asserted to conductively connect terminals 53 and 47 as indicated by arrow 76, thereby connecting capacitor 52 and floating diffusion region 46 for the low conversion gain mode of operation (while control signal TX_BR for transistor 42 is deasserted and photodiode 40 is isolated from capacitor 52 and floating diffusion region 46).

The layout for a coupled-gates structure in a pixel as shown in FIG. 6 is merely illustrative. If desired, any suitable pixel layout may be used to implement a coupled-gates structure (e.g., the coupled-gates structure in pixel 22 in FIG. 3).

In the example of FIG. 3, pixel 22 includes a coupled-gates structure with two output terminals (e.g., a first output terminal coupled to low gain capacitor 52 and a second output terminal coupled to floating diffusion region 46). This is merely illustrative. If desired, an image pixel may include a coupled-gates structure with any suitable number of output terminals coupled to appropriate corresponding elements.

Figure 7:
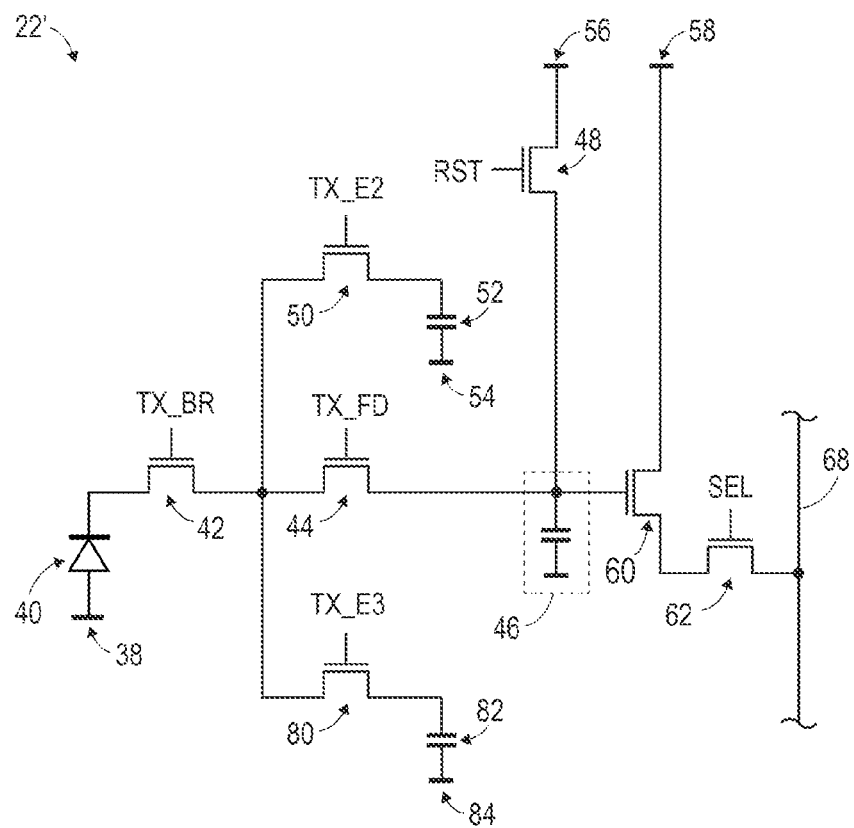
FIG. 7 is a circuit diagram of an illustrative image pixel having a coupled-gates structure with three output terminals in accordance with some embodiments.

FIG. 7 is a circuit diagram of an illustrative image pixel 22' having a coupled-gates structure with three output terminals. In some illustrative embodiments, array 20 (FIG. 2) may include image pixel 22' in FIG. 7. Pixel 22' includes some of the same or similar elements as pixel 22 in FIG. 3 (e.g., photodiode 40, transistors 42, 44, 48, 50, 60, and 62, capacitor 52, floating diffusion region 46). Description of these same or similar elements are omitted in order to not unnecessarily obscure the embodiments of FIG. 7. Unless otherwise specified, the corresponding elements in pixel 22' may serve the same or similar functions, be coupled and connected to each other in the same or similar manners, and be configured and operable in the same or similar manners as elements described in connection with pixel 22 in FIGS. 3-6.

As shown in FIG. 7, pixel 22' includes two charge storage structures such as two low gain capacitors 52 and 82 (compared to one low gain capacitor 52 in pixel 22 in FIG. 3). Accordingly, pixel 22' includes a coupled-gates structure having one input terminal (e.g., the terminal of transistor 42 coupled to photodiode 40), and three output terminals (e.g., the terminal of transistor 50 coupled to capacitor 52, the terminal of transistor 44 coupled to floating diffusion region 46, and the terminal of transistor 80 coupled to capacitor 82). The flow of overflow charge from photodiode 40 may be modulated between the three output terminals in the example of FIG. 7 (instead of the two output terminals in the example of FIG. 3).

As shown in FIG. 7 and analogous to capacitor 52, capacitor 82 is coupled to transistor 80 at a first terminal and coupled to a voltage terminal 84 at a second terminal. Voltage terminal 84 may receive a reference voltage (signal). As examples, voltage terminal 84 may provide a fixed refence voltage to the second terminal of capacitor 82 or may provide a variable reference voltage signal (e.g., exhibiting a first voltage value during a first time period and a second voltage value during a second time period) to the second terminal of capacitor 82. If desired, voltage terminals 54 and 84 may receive the same reference voltage (signal).

In the example of FIG. 7, transistors 42 and 80 couple photodiode 40 to capacitor 82, thereby allowing capacitor 82 to receive overflow charge above the potential barrier set by transistor 42 from photodiode 40 using transistors 42 and 80. Transistors 44 and 80 couple floating diffusion region 46 to capacitor 82, thereby allowing capacitor 82 to form a conductive path between floating diffusion region 46 and capacitor 82 using transistors 44 and 80 (e.g., for a charge sharing operation, for a charge transfer operation, etc.). Similar to capacitor 52, capacitor 82 may be configured to integrate overflow charge received from photodiode 40 over multiple pulsing time periods and store the integrated overflow charge.

Figure 8:
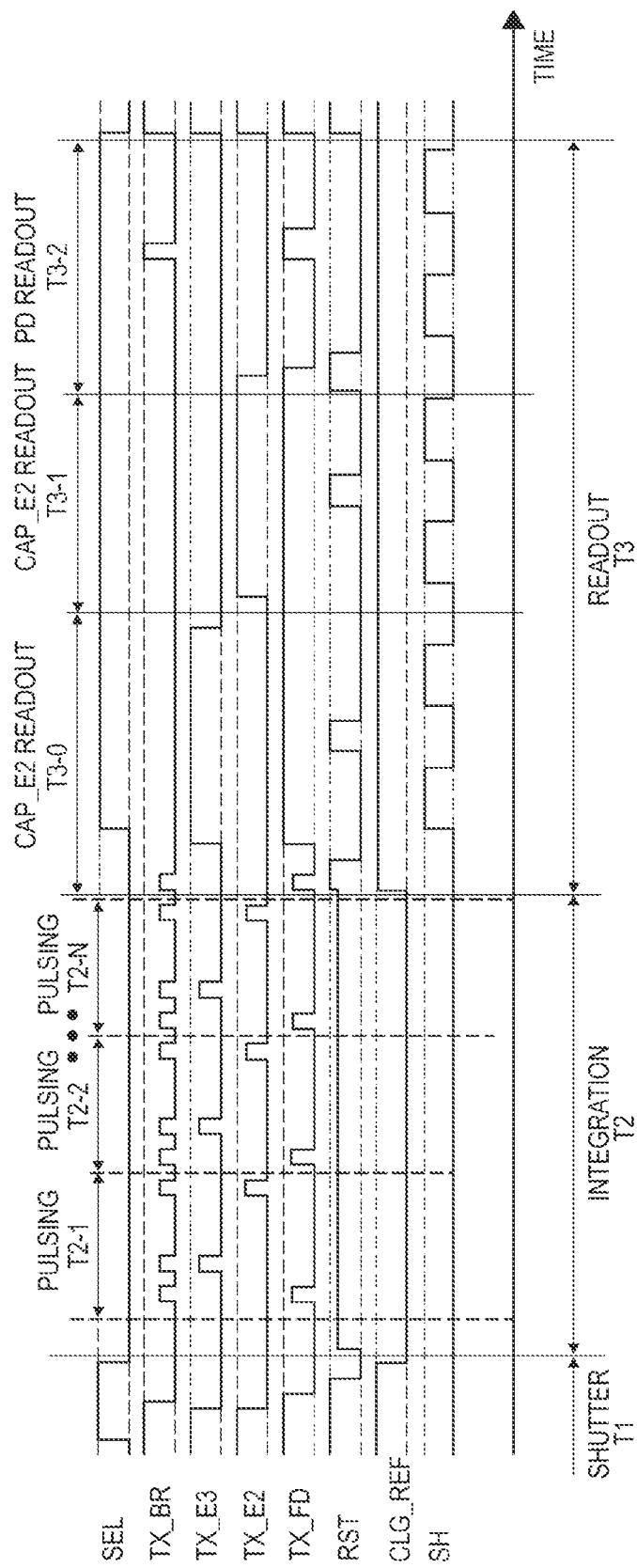
FIG. 8 is an illustrative timing diagram for operating an image pixel such as the image pixel in FIG. 7 in accordance with some embodiments.

FIG. 8 is an illustrative timing diagram showing how a pixel such as pixel 22' in FIG. 7 may be operable to generate multiple image signals based a single integration cycle (e.g., a single integration time period). In particular, because capacitors 52 and 82 may each separately store corresponding integrated overflow charge and be configured to extend the storage capacity of floating diffusion region 46, pixel 22' may be operable to generate two low gain image signals (e.g., greater than the one low gain image signal generated in the case of pixel 22 in the illustrative examples described in connection with FIGS. 3-6).

The timing diagram in FIG. 8 (e.g., described in connection with pixel 22' in FIG. 7) includes some of the same or similar features as the timing diagram in FIG. 4 (e.g., described in connection with pixel 22 in FIG. 3). Description of these same or similar features are omitted in order to not unnecessarily obscure the embodiments of FIG. 8. Unless otherwise specified, the corresponding features in the timing diagram of FIG. 8 may serve the same or similar functions, have the same or similar characteristics, and be configure and operate pixels (e.g., a pixel row, a pixel array) in the same or similar manners as features described in connection with the timing diagram of FIG. 4.

In the example of FIG. 8, control signal TX_E3, in addition to control signals SEL, TX_BR, TX_E2, TX_FD, RST, CLG_REF, and SH (as described in connection with FIG. 4), may be used to control the operation of pixel 22' in FIG. 7. Each control signal may be provided to a corresponding element in pixel 22' in FIG. 7 as similarly described in connection with FIGS. 3 and 4. With reference to control signal TX_E3, control circuitry may provide control signal TX_E3 to transistor 80 in pixel 22' in FIG. 7. In particular, the control circuitry such as row control circuitry 26 and/or control circuitry 24 (FIG. 2) may be configured to provide one or more (e.g., all) of these controls signal to corresponding elements in pixel 22' (and to other circuitry such as readout circuitry 28)

As shown in FIG. 8, the control circuitry may operate pixel 22' during a shutter time period T1, an integration time period T2, and a readout time period T3. During shutter time period T1, the control circuitry may fully assert control signal TX_E3 in addition to control signals SEL, TX_BR, TX_E2, TX_FD, and RST to reset pixel elements in pixel 22' (e.g., capacitor 82, floating diffusion region 46, photodiode 40, capacitor 52, etc.) to a reset voltage level (e.g., a pixel power supply voltage supplied at voltage terminal 56).

During integration time period T2, the control circuitry may similarly operate pixel 22' in a number of pulsing time periods T2-1, T2-2, . . . , T2-N. In addition to modulating between control signals TX_FD (for transistor 44) and TX_E2 (for transistor 50) during each pulsing period as described in connection with FIG. 4, the control circuitry may also modulate between control signal TX_E3 for transistor 80 (in combination with control signals TX_FD and TX_E2). This may serve to distribute the overflow charge defined by transistor 42 to one of floating diffusion region 46, capacitor 82, or capacitor 52 (one at a time). Respective overflow charge may be transferred to each of floating diffusion region 46, capacitor 82, and capacitor 52 during any given pulsing time period.

In the example of FIG. 8, the simultaneous (partial) assertions for control signals TX_BR and TX_E3 may occur between the simultaneous (partial) assertions for control signals TX_BR and TX_FD and the simultaneous (partial) assertions for control signals TX_BR and TX_E2 for each pulsing time period. Additionally, for each pulsing time period, the first time period between the simultaneous assertions of TX_BR and TX_FD and the simultaneous assertions of TX_BR and TX_E3 may be shorter than the second time period between the simultaneous assertions of TX_BR and TX_E3 and the simultaneous assertions of TX_BR and TX_E3. This may allow capacitor 82 to store charge for higher (brighter) light conditions than capacitor 52, as an example. As described in connection with FIG. 4, capacitor 52 may integrate or combine the overflow charge received across the multiple pulsing time periods. Similarly, capacitor 82 may also integrate or combine the overflow charge received across the multiple pulsing time periods.

During readout time period T3, the control circuitry may perform a pixel readout operation for signals associated with capacitor 52 (e.g., CAP_E2 readout) and photodiode 40 (PD readout) during time periods T3-1 and T3-2, respectively, for pixel 22' in a similar manner as described in connection with FIG. 4 for pixel 22. Additionally, when operating pixel 22', the control circuitry may also perform the readout operation to include a readout for signals associated with capacitor 82 (e.g., CAP_E3 readout) during readout time period T3-0 before readout time period T3-1 and after integration time period T2.

Analogous to the readout operation for capacitor 52 (e.g., during time period T3-1 in FIG. 4), during readout time period T3-0, the control circuitry may first reset floating diffusion region 46 and remove any additional overflow overcharge from photodiode 40 by asserting control signal RST and partially asserting control signals TX_BR and TX_FD.

Thereafter, the control circuitry may (fully) assert control signals TX_E3 and TX_FD simultaneously to conductively connect capacitor 82 to floating diffusion region 46 through transistors 44 and 80. This can allow a low conversion gain readout of overflow charge at capacitor 82 (e.g., overflow charge that combines or integrates overflow charge from each of the pulsing periods) by extending the storage capacity of floating diffusion region 46 using capacitor 82. In particular, the control circuitry may assert control signal SH to activate sampling circuitry in readout circuitry to sample and store (e.g., at the sampling circuitry) a low conversion gain image signal associated with the overflow charge shared between capacitor 82 and floating diffusion region 46.

Subsequently, the control circuitry may assert control signal RST (while control signals TX_E3 and TX_FD remain asserted) to reset floating diffusion region 46 and capacitor 82 to a reset voltage level (e.g., a pixel power supply voltage supplied at voltage terminal 56). After control signal RST is deasserted, the control circuitry may assert control signal SH (while control signals TX_E3 and TX_FD remain asserted) to sample and store a reset level signal generated based on the reset voltage level at floating diffusion region 46 (having its storage capacity extend by capacitor 82 in a low conversion gain mode of operation). This reset level signal may be associated with the overflow charge low conversion gain image signal and may be used to compensate for noise in the overflow charge low conversion gain image signal.

Since, after readout time period T3-0, floating diffusion region 46 has already been reset to the reset voltage level, readout time period T3-1 may omit another floating diffusion region reset operation (e.g., in contrast with readout time period T3-1 as described in connection with FIG. 4). Otherwise, the control circuitry may operate pixel 22' during readout time periods T3-1 and T3-2 as analogously described in connection with FIG. 4 for pixel 22 in FIG. 3. Additionally, if desired, reference voltage signal CLG_REF may be provided to voltage terminal 84 (in addition to voltage terminal 54).

In the examples of FIGS. 3-6, pixel 22 may generate a first (E2) low conversion gain signal (associated with overflow charge stored at capacitor 52) optimal for relatively high light conditions and a second (E1) high conversion gain signal (associated with remaining charge stored at photodiode 40) optimal for relatively low light conditions. In the examples of FIGS. 7 and 8, pixel 22' may also generate a first (E2) low conversion gain signal (associated with overflow charge stored at capacitor 52) optimal for relatively high light conditions and a second (E1) high conversion gain signal (associated with remaining charge stored at photodiode 40) optimal for relatively low light conditions. Additionally, pixel 22' may generate an additional (E3) low conversion gain signal (associated with overflow charge stored at capacitor 82) optimal for relatively even higher light conditions, thereby further extending the dynamic range of pixel 22' (e.g., when compared to pixel 22).

Figure 9:
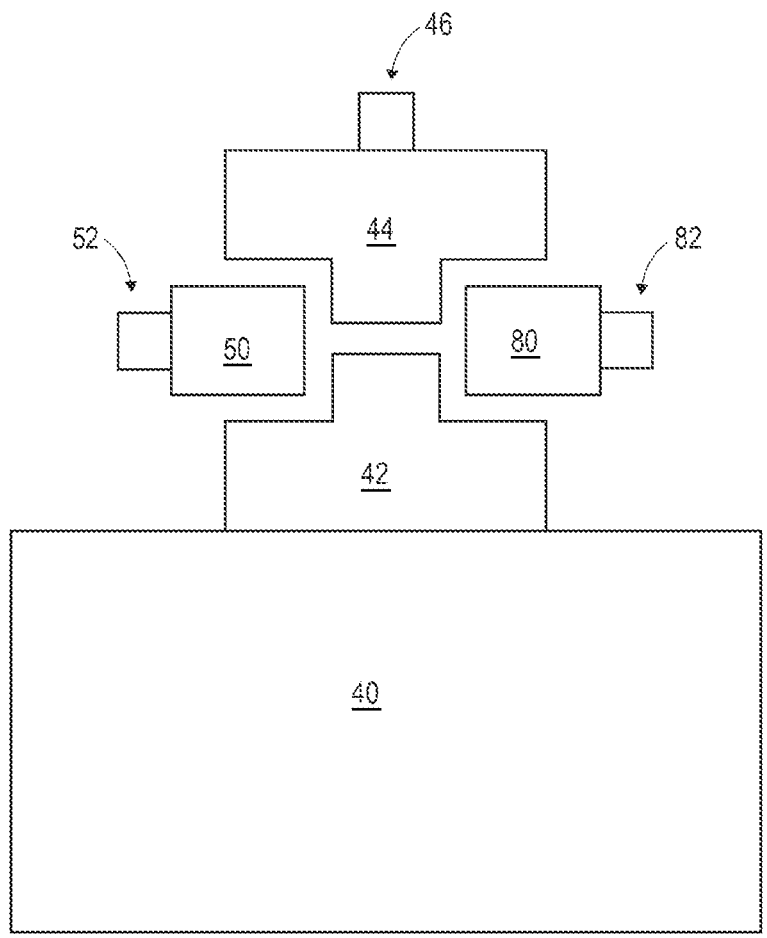
FIG. 9 is an illustrative pixel layout for implementing a coupled-gates structure such as the coupled-gates structure in FIG. 7 in accordance with some embodiments.
Figure 10:
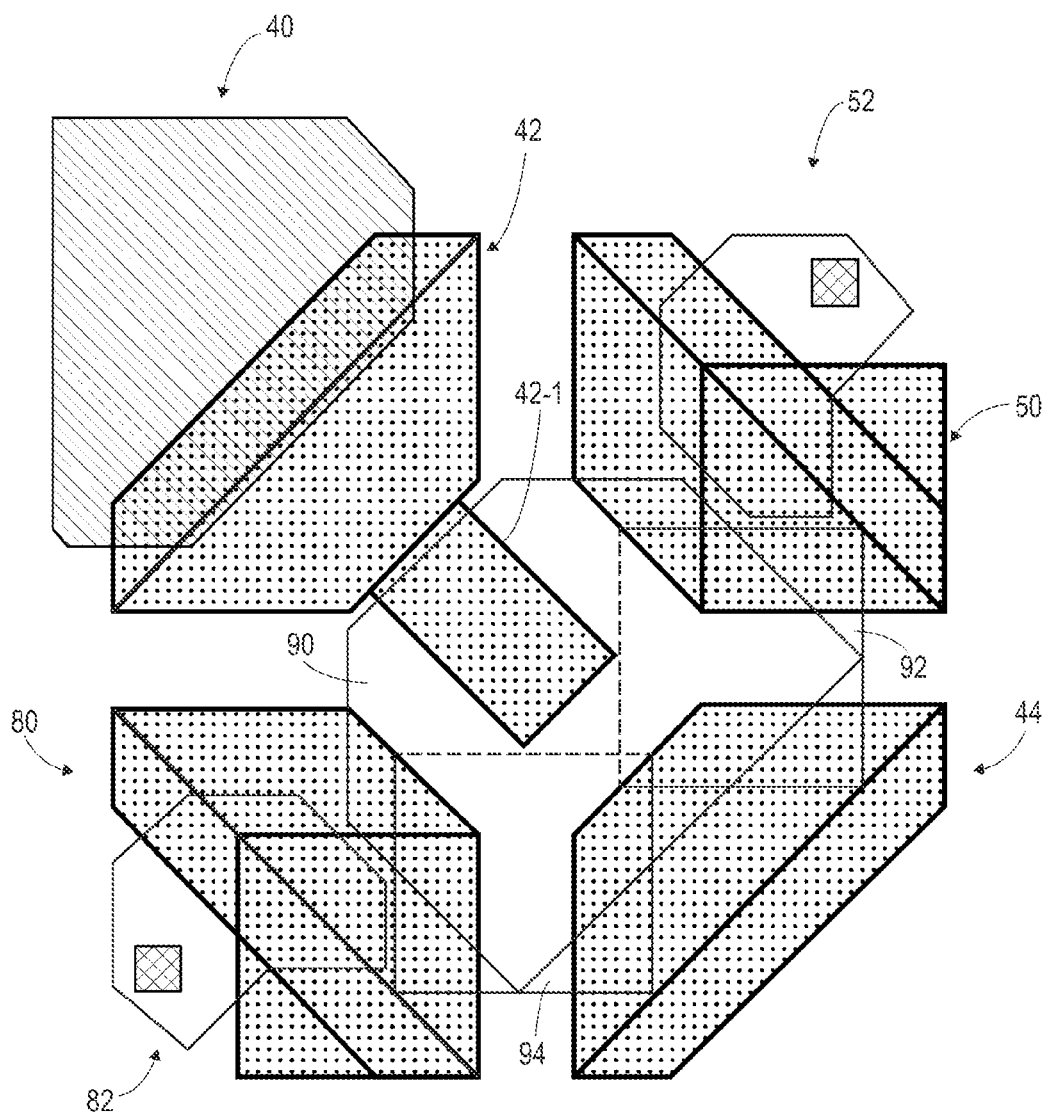
FIG. 10 is an additional illustrative pixel layout for implementing a coupled-gates structure such as the coupled-gates structure in FIG. 7 in accordance with some embodiments.

FIGS. 9 and 10 are schematic plan views of illustrative pixel layouts for implementing a coupled-gates structure such as the coupled-gates structure in pixel 22' in FIG. 7 (e.g., transistors 42, 44, 50, and 80 in FIG. 7). As shown in FIG. 9, transistor (or gate) 42 may be interposed between photodiode 40 and transistors (or gates) 44, 50, and 80. Transistor 42 may be adjacent to transistor 50 on one side, may be adjacent to transistor 80 on the opposing side, and may be adjacent to transistor 44 in the middle. Similarly, transistor 44 may be adjacent to transistor 50 on one side, may be adjacent to transistor 80 on the opposing side, and may be adjacent to transistor 42 in the middle. Transistors 50 and 80 may be separated from each other by portions of transistors 42 and 44. Transistor 50 may be coupled to a terminal connected to the first terminal of capacitor 52. Transistor 80 may be coupled to a terminal connected to the first terminal of capacitor 82. Transistor 44 may be coupled to a terminal connected to floating diffusion region 46.

Configured in such a manner, transistor 42 (by receiving a partially asserted control signal) may form a potential barrier that defines overflow charge from photodiode 40. During the integration time period (e.g., during each pulsing period in FIG. 8), control signals TX_FD (for transistor 44), TX_E2 (for transistor 50), and TX_E3 (for transistor 80) may be modulated (e.g., asserted one at a time with suitable frequencies and durations) to direct the overflow charge over the formed potential barrier to one of floating diffusion region 46, capacitor 52, or capacitor 82. During the readout time period (e.g., readout time periods T3-1 in FIG. 8), control signals TX_FD and TX_E2 may be asserted to conductively connect capacitor 52 and floating diffusion region 46 for a low conversion gain mode of operation (while control signals TX_BR for transistor 42 and TX_E3 for transistor 80 are deasserted and photodiode 40 and capacitor 82 are isolated from capacitor 52 and floating diffusion region 46). During the readout time period (e.g., readout time periods T3-0 in FIG. 8), control signals TX_FD and TX_E3 may be asserted to conductively connect capacitor 82 and floating diffusion region 46 for a low conversion gain mode of operation (while control signal TX_BR for transistor 42 and TX_E2 for transistor 50 are deasserted and photodiode 40 and capacitor 52 are isolated from capacitor 82 and floating diffusion region 46).

In an alternative layout shown in FIG. 10, transistors 42, 50, 80, and 44 may be formed at the four corners of a rectangular pixel outline. A (conductive) implant region 90 may be overlapped by transistors 42 (e.g., protruding portion 42-1), 50, 80, and 44, thereby allowing the transfer of overflow charge to the corresponding charge storage structure (e.g., capacitor 52, capacitor 82, and floating diffusion region 46 connected to transistor 44). Another (conductive) implant region 92 may be overlapped by transistors 50 and 44, thereby providing a conductive path between capacitor 52 and floating diffusion region 46 (e.g., through transistors 50 and 44 and through implant region 92). Yet another (conductive) implant region 94 may be overlapped by transistors 80 and 44, thereby providing a conductive path between capacitor 82 and floating diffusion region 46 (e.g., through transistors 80 and 44 and through implant region 94). The configuration in FIG. 10 may configure pixel 22 to exhibit the same functionality as that of FIG. 9.

The layouts for coupled-gates structures having three output terminals in pixels as shown in FIGS. 9 and 10 are merely illustrative. If desired, any suitable pixel layout may be used to implement a coupled-gates structure (e.g., the coupled-gates structure in pixel 22' in FIG. 7).

Various embodiments have been described illustrating image sensors having image pixels with coupled-gates structures.

As an illustrative example, an image sensor pixel may include a photosensitive element (e.g., photodiode), a floating diffusion region, first and second transistors that couple the photosensitive element to the floating diffusion region, a charge storage structure (e.g., a capacitor), and a third transistor. The second and third transistors may be configured to form a conductive path between the floating diffusion region and the charge storage structure during a pixel readout operation (e.g., during a low conversion gain readout of overflow charge stored at the charge storage structure). The first transistor may be configured to form a potential barrier that defines an overflow portion of charge generated by the photosensitive element. The first and third transistors may be configured to transfer the overflow portion of charge from the photosensitive element to the charge storage structure. The image sensor pixel may further include a reset transistor that couples the floating diffusion region to a supply voltage terminal, and a source follower transistor that couples the floating diffusion region to a pixel output path. If desired, the image sensor pixel may be configured to output a low conversion gain image signal based on the overflow portion of charge and may be configured output a high conversion gain image signal based on a remaining portion of charge stored at the photosensitive element.

If desired, the image sensor pixel may further include an additional charge storage structure (e.g., an additional capacitor) and a fourth transistor. The first and fourth transistors may be configured to transfer the overflow portion of charge from the photosensitive element to the additional charge storage structure. The second and fourth transistors may be configured to form an additional conductive path between the floating diffusion region and the additional charge storage structure during the pixel readout operation (e.g., during a low conversion gain readout of overflow charge stored at the additional charge storage structure). If desired, the image sensor pixel may be configured to output a first low conversion gain image signal based on a first portion of charge stored at the charge storage structure, may be configured to output a second low conversion gain image signal based on a second portion of charge stored at the additional charge storage structure, and may be configured output a high conversion gain image signal based on a remaining portion of charge stored at the photosensitive element.

As another illustrative example, an image sensor may include control circuitry (e.g., row control circuitry), readout circuitry (e.g., column readout circuitry), and an array of image pixels coupled to the control circuitry and coupled to the readout circuitry. One or more image pixels in the array may each include: a photosensitive element, a floating diffusion region, a capacitor, and a coupled-gates structure having an input terminal coupled to the photosensitive element, a first output terminal coupled to the floating diffusion region, and a second output terminal coupled to the capacitor. The control circuitry may be configured to control the coupled-gates structure to form a conductive path between the first and second output terminals and connect the floating diffusion region to the capacitor through the coupled-gates structure.

In particular, the coupled-gates structure may include a first transistor coupled to the photosensitive element, a second transistor coupled to the floating diffusion region, and a third transistor coupled to the capacitor. The control circuitry may be configured to control the first transistor to define overflow portions of charge generated by the photosensitive element and to define a remaining portion of charge generated by and stored at the photosensitive element. The control circuitry may be configured to activate the second transistor to transfer a first set of the overflow portions of charge to the floating diffusion region and to activate the third transistor to transfer a second set of the overflow portions of charge to the capacitor. The readout circuitry may be configured to receive (e.g., from the image pixel) a first image signal generated based on the second set of the overflow portions of charge and to receive a second image signal generated based on the remaining portion of charge stored at the photosensitive element.

As yet another illustrative example, a method of operating an image sensor pixel may include: generating charge in response to incident light at a photosensitive element, defining overflow portions of the generated charge at a first transistor, modulating a transfer of the overflow portions of the generated charge between a floating diffusion region and a charge storage structure (e.g., a capacitor) using second and third transistors (e.g., selectively activating the second and third transistors one at time to transfer respective overflow portions to the floating diffusion region or the charge storage structure), and connecting the floating diffusion region to the charge storage structure using the second and third transistors during a readout operation (e.g., during a low conversion gain readout of overflow charge stored at the charge storage structure). The method may further include outputting a low conversion gain image signal while connecting the floating diffusion region to the charge storage structure using the second and third transistors, transferring a remaining portion of the generated charge to the floating diffusion region using the first and second transistors during the readout operation (e.g., for a high conversion gain readout of the remaining charge stored at the photosensitive element), and outputting a high conversion gain image signal after transferring the remaining portion of the generated charge to the floating diffusion region using the first and second transistors. If desired, the method may further include removing any overflow portions of the generated charge transferred to the floating diffusion region (e.g., by resetting the floating diffusion region to a reset voltage level) before connecting the floating diffusion region to the charge storage structure using the second and third transistors.

The foregoing is merely illustrative of the principles of this invention and various modifications can be made by those skilled in the art without departing from the scope and spirit of the invention. The foregoing embodiments may be implemented individually or in any combination.

What is claimed is:

1. An image sensor pixel comprising:
   a photosensitive element;
   a floating diffusion region;
   a first transistor that couples the photosensitive element to the floating diffusion region;
   a charge storage structure; and
   a second transistor that couples the photosensitive element to the charge storage structure, wherein the first and second transistors are configured to form a conductive path between the floating diffusion region and the charge storage structure, wherein the charge storage structure has a terminal directly coupled to only one transistor, and wherein the only one transistor is the second transistor.

2. The image sensor pixel defined in claim 1, wherein the charge storage structure comprises a capacitor.

3. The image sensor pixel defined in claim 1 further comprising:
   a third transistor, wherein the first and third transistors couple the photosensitive element to the floating diffusion region.

4. The image sensor pixel defined in claim 3, wherein the second and third transistors couple the photosensitive element to the charge storage structure.

5. The image sensor pixel defined in claim 3, wherein the third transistor is configured to form a potential barrier that defines an overflow portion of charge generated by the photosensitive element.

6. The image sensor pixel defined in claim 5, wherein the first and third transistors are configured to transfer the overflow portion of charge from the photosensitive element to the charge storage structure.

7. The image sensor pixel defined in claim 1 further comprising:
   a reset transistor that couples the floating diffusion region to a supply voltage terminal; and
   a source follower transistor that couples the floating diffusion region to a pixel output path.

8. The image sensor pixel defined in claim 7, wherein the first transistor, the third transistor, and the reset transistor form an anti-blooming path for the photosensitive element.

9. The image sensor pixel defined in claim 1, wherein the charge storage structure is configured to extend a storage capacity of the floating diffusion region in a low conversion gain mode of operation.

10. The image sensor pixel defined in claim 1, wherein the image sensor pixel is configured to output a low conversion gain image signal and a high conversion gain image signal.

11. The image sensor pixel defined in claim 1, wherein the charge storage structure has an additional terminal directly coupled to a reference voltage terminal.

12. The image sensor pixel defined in claim 1, wherein the first and second transistors are configured to form the conductive path between the floating diffusion region and the charge storage structure for a pixel readout operation.

13. The image sensor pixel defined in claim 1 further comprising:
   an additional charge storage structure coupled to the floating diffusion region.

14. The image sensor pixel defined in claim 13 further comprising:
   a third transistor that couples the photosensitive element to the additional charge storage structure.

15. The image sensor pixel defined in claim 14, wherein the first and third transistors are configured to form an additional conductive path between the floating diffusion region and the additional charge storage structure.

16. The image sensor pixel defined in claim 1 further comprising:
   a third transistor, wherein the first, second, and third transistors form a coupled-gates structure and share a common terminal.

17. The image sensor pixel defined in claim 16, wherein the third transistor couples the photosensitive element to the common terminal, wherein the first transistor couples the floating diffusion region to the common terminal, and the second transistor couples the charge storage structure to the common terminal.

18. An image sensor pixel comprising:
   a photosensitive element;
   a floating diffusion region;
   a first transistor coupled between the photosensitive element and the floating diffusion region;
   a second transistor; and
   a charge storage structure coupled to the photosensitive element, wherein the charge storage structure is connected to the floating diffusion region by only one conductive path, wherein the one conductive path runs through at least the first transistor and the second transistor, and wherein the second transistor is coupled between the photosensitive element and the charge storage structure.

19. The image sensor pixel defined in claim 18 further comprising:
   a third transistor, wherein the first transistor and the third transistor are coupled in series between the photosensitive element and the floating diffusion region.

20. The image sensor pixel defined in claim 18 wherein the charge storage structure comprises a capacitor.

* * * * *